(12) United States Patent
Johnson

(10) Patent No.: US 7,523,495 B2
(45) Date of Patent: Apr. 21, 2009

(54) METHODS AND SYSTEMS FOR IC CARD APPLICATION LOADING

(75) Inventor: Alan E. Johnson, Essex (GB)

(73) Assignee: Multos Limited, London (GB)

( * ) Notice: Subject to any disclaimer, the term of this patent is extended or adjusted under 35 U.S.C. 154(b) by 0 days.

(21) Appl. No.: 11/737,712

(22) Filed: Apr. 19, 2007

(65) Prior Publication Data
US 2008/0005559 A1    Jan. 3, 2008

Related U.S. Application Data

(60) Provisional application No. 60/793,543, filed on Apr. 19, 2006.

(51) Int. Cl.
*H04L 9/32* (2006.01)

(52) U.S. Cl. .............................. 726/20; 726/7

(58) Field of Classification Search .................. None
See application file for complete search history.

(56) References Cited

U.S. PATENT DOCUMENTS

| | | |
|---|---|---|
| 4,214,230 A | 7/1980 | Fak et al. |
| 4,218,582 A | 8/1980 | Hellman et al. |
| 4,259,720 A | 3/1981 | Campbell |
| 4,302,810 A | 11/1981 | Bouricius et al. |
| 4,305,059 A | 12/1981 | Benton |
| 4,321,672 A | 3/1982 | Braun et al. |
| 4,341,951 A | 7/1982 | Benton |
| 4,405,829 A | 9/1983 | Rivest et al. |
| 4,408,203 A | 10/1983 | Campbell |
| 4,423,287 A | 12/1983 | Zeidler |
| 4,442,345 A | 4/1984 | Mollier et al. |
| 4,453,074 A | 6/1984 | Weinstein |
| 4,467,139 A | 8/1984 | Mollier |
| 4,498,000 A | 2/1985 | Decavele et al. |

(Continued)

FOREIGN PATENT DOCUMENTS

EP    0 152 024 B1    8/1985

(Continued)

OTHER PUBLICATIONS

Davies et al., *Security for Computer Networks: An Introduction to Data Security in Teleprocessing and Electronic Funds Transfer*, John Wiley & Sons, New York, NY, 1984.

(Continued)

*Primary Examiner*—Brandon S Hoffman
(74) *Attorney, Agent, or Firm*—Sonnenschein, Nath & Rosenthal LLP

(57) ABSTRACT

Systems and methods are described that provide a new type of application load unit for use in the secure loading of applications and/or data onto integrated circuit cards or smart cards. Plaintext key transformation units can be created for each of a plurality of smart cards that are to be loaded with a desired or selected application. A plaintext key transformation unit may be individually encrypted using the public keys associated with target smart cards. An application provider can create one or more application load unit using known means and can then create one or more additional plaintext key transformation unit, one for each target smart card using corresponding public keys which can be obtained taken from a database of card public keys.

13 Claims, 2 Drawing Sheets

U.S. PATENT DOCUMENTS

| | | |
|---|---|---|
| 4,536,647 A | 8/1985 | Atalla et al. |
| 4,578,530 A | 3/1986 | Zeidler |
| 4,605,820 A | 8/1986 | Campbell, Jr. |
| 4,629,872 A | 12/1986 | Hällberg |
| 4,630,201 A | 12/1986 | White |
| 4,650,978 A | 3/1987 | Hudson et al. |
| 4,669,596 A | 6/1987 | Capers et al. |
| 4,705,211 A | 11/1987 | Honda et al. |
| 4,709,136 A | 11/1987 | Watanabe |
| 4,709,137 A | 11/1987 | Yoshida |
| 4,727,243 A | 2/1988 | Savar |
| 4,727,244 A | 2/1988 | Nakano et al. |
| 4,731,842 A | 3/1988 | Smith |
| 4,734,568 A | 3/1988 | Watanabe |
| 4,736,094 A | 4/1988 | Yoshida |
| 4,742,215 A | 5/1988 | Daughters et al. |
| 4,745,267 A | 5/1988 | Davis et al. |
| 4,746,788 A | 5/1988 | Kawana |
| 4,748,557 A | 5/1988 | Tamada et al. |
| 4,748,668 A | 5/1988 | Shamir et al. |
| 4,752,677 A | 6/1988 | Nakano et al. |
| 4,757,185 A | 7/1988 | Onishi |
| 4,757,543 A | 7/1988 | Tamada et al. |
| 4,759,063 A | 7/1988 | Chaum |
| 4,759,064 A | 7/1988 | Chaum |
| 4,767,920 A | 8/1988 | Kitta et al. |
| 4,778,983 A | 10/1988 | Ushikubo |
| 4,785,166 A | 11/1988 | Kushima |
| 4,786,790 A | 11/1988 | Kruse et al. |
| 4,797,542 A | 1/1989 | Hara |
| 4,797,920 A | 1/1989 | Stein |
| 4,798,941 A | 1/1989 | Watanabe |
| 4,802,218 A | 1/1989 | Wright et al. |
| 4,803,347 A | 2/1989 | Sugahara et al. |
| 4,811,393 A | 3/1989 | Hazard |
| 4,816,653 A | 3/1989 | Anderl et al. |
| 4,816,654 A | 3/1989 | Anderl et al. |
| 4,825,052 A | 4/1989 | Chemin et al. |
| 4,831,245 A | 5/1989 | Ogasawara |
| 4,833,595 A | 5/1989 | Iijima |
| 4,839,504 A | 6/1989 | Nakano |
| 4,839,792 A | 6/1989 | Iijima |
| 4,849,614 A | 7/1989 | Watanabe et al. |
| 4,853,522 A | 8/1989 | Ogasawara |
| 4,853,961 A | 8/1989 | Pastor |
| 4,874,935 A | 10/1989 | Younger |
| 4,877,945 A | 10/1989 | Fujisaki |
| 4,877,947 A | 10/1989 | Mori |
| 4,879,747 A | 11/1989 | Leighton et al. |
| 4,882,474 A | 11/1989 | Anderl et al. |
| 4,887,234 A | 12/1989 | Iijima |
| 4,891,503 A | 1/1990 | Jewell |
| 4,891,506 A | 1/1990 | Yoshimatsu |
| 4,900,904 A | 2/1990 | Wright et al. |
| 4,901,276 A | 2/1990 | Iijima |
| 4,906,828 A | 3/1990 | Halpern |
| 4,907,270 A | 3/1990 | Hazard |
| 4,926,480 A | 5/1990 | Chaum |
| 4,935,962 A | 6/1990 | Austin |
| 4,949,257 A | 8/1990 | Orbach |
| 4,961,142 A | 10/1990 | Elliott et al. |
| 4,969,188 A | 11/1990 | Schöbi |
| 4,977,595 A | 12/1990 | Ohta et al. |
| 4,984,270 A | 1/1991 | LaBounty |
| 4,985,615 A | 1/1991 | Iijima |
| 4,987,593 A | 1/1991 | Chaum |
| 4,993,068 A | 2/1991 | Piosenka et al. |
| 4,995,081 A | 2/1991 | Leighton et al. |
| 4,996,711 A | 2/1991 | Chaum |
| 5,001,753 A | 3/1991 | Davio et al. |
| 5,003,594 A | 3/1991 | Shinagawa |
| 5,005,200 A | 4/1991 | Fischer |
| 5,010,239 A | 4/1991 | Mita |
| 5,012,074 A | 4/1991 | Masada |
| 5,012,076 A | 4/1991 | Yoshida |
| 5,014,312 A | 5/1991 | Lisimaque et al. |
| 5,016,274 A | 5/1991 | Micali et al. |
| 5,038,025 A | 8/1991 | Kodera |
| 5,068,894 A | 11/1991 | Hoppe |
| 5,093,862 A | 3/1992 | Scwartz |
| 5,097,115 A | 3/1992 | Ogasawara et al. |
| 5,120,939 A | 6/1992 | Claus et al. |
| 5,128,997 A | 7/1992 | Pailles et al. |
| 5,131,038 A | 7/1992 | Puhl et al. |
| 5,142,578 A | 8/1992 | Matyas et al. |
| 5,146,499 A | 9/1992 | Geffrotin |
| 5,148,481 A | 9/1992 | Abraham et al. |
| 5,161,231 A | 11/1992 | Iijima |
| 5,162,989 A | 11/1992 | Matsuda |
| 5,163,098 A | 11/1992 | Dahbura |
| 5,164,988 A | 11/1992 | Matyas et al. |
| 5,165,043 A | 11/1992 | Miyahara et al. |
| 5,166,503 A | 11/1992 | Mizuta |
| 5,175,416 A | 12/1992 | Mansvelt et al. |
| 5,180,901 A | 1/1993 | Hiramatsu |
| 5,191,193 A | 3/1993 | Le Roux |
| 5,191,608 A | 3/1993 | Geronimi |
| 5,200,999 A | 4/1993 | Matyas et al. |
| 5,201,000 A | 4/1993 | Matyas et al. |
| 5,202,922 A | 4/1993 | Iijima |
| 5,214,702 A | 5/1993 | Fischer |
| 5,224,162 A | 6/1993 | Okamoto et al. |
| 5,243,175 A | 9/1993 | Kato |
| 5,247,578 A | 9/1993 | Pailles et al. |
| 5,293,577 A | 3/1994 | Hueske et al. |
| 5,371,797 A | 12/1994 | Bocinsky, Jr. |
| 5,378,884 A | 1/1995 | Lundstrom et al. |
| 5,420,405 A | 5/1995 | Chasek |
| 5,452,431 A | 9/1995 | Bournas |
| 5,473,690 A | 12/1995 | Grimonprez et al. |
| 5,485,520 A | 1/1996 | Chaum et al. |
| 5,511,121 A | 4/1996 | Yacobi |
| 5,517,011 A | 5/1996 | Vandenengel |
| 5,530,232 A | 6/1996 | Taylor |
| 5,534,857 A | 7/1996 | Laing et al. |
| 5,539,825 A | 7/1996 | Akiyama et al. |
| 5,542,081 A | 7/1996 | Geronimi |
| 5,544,246 A | 8/1996 | Mandelbaum et al. |
| 5,546,523 A | 8/1996 | Gatto |
| 5,557,516 A | 9/1996 | Hogan |
| 5,574,269 A | 11/1996 | Mori et al. |
| 5,578,808 A | 11/1996 | Taylor |
| 5,581,708 A | 12/1996 | Iijima |
| 5,588,146 A | 12/1996 | Leroux |
| 5,682,027 A | 10/1997 | Bertina et al. |
| 5,692,132 A | 11/1997 | Hogan |
| 5,699,528 A | 12/1997 | Hogan |
| 5,704,046 A | 12/1997 | Hogan |
| 5,705,798 A | 1/1998 | Tarbox |
| 5,708,780 A | 1/1998 | Levergood et al. |
| 5,715,314 A | 2/1998 | Payne et al. |
| 5,724,424 A | 3/1998 | Gifford |
| 5,796,831 A | 8/1998 | Paradinas et al. |
| 5,825,875 A | 10/1998 | Ugon |
| 5,841,870 A | 11/1998 | Fieres et al. |
| 5,844,218 A | 12/1998 | Kawan et al. |
| 5,889,941 A | 3/1999 | Tushie et al. |
| 5,923,844 A | 7/1999 | Peyret et al. |
| 6,005,942 A | 12/1999 | Chan et al. |
| 6,038,551 A | 3/2000 | Barlow et al. |
| 6,230,267 B1 | 5/2001 | Richards et al. |
| 6,233,683 B1 | 5/2001 | Chan et al. |
| 6,317,832 B1 | 11/2001 | Everett et al. |
| 6,385,723 B1 | 5/2002 | Richards |

| | | |
|---|---|---|
| 6,488,211 B1 | 12/2002 | Everett et al. |
| 6,575,372 B1 | 6/2003 | Everett et al. |
| 6,659,354 B2 | 12/2003 | Everett et al. |
| 6,742,715 B2 | 6/2004 | Everett et al. |
| 7,469,339 B2 | 12/2008 | Everett et al. |
| 2002/0062451 A1* | 5/2002 | Scheidt et al. .............. 713/201 |
| 2007/0143616 A1 | 6/2007 | Everett et al. |
| 2007/0180276 A1 | 8/2007 | Everett et al. |
| 2007/0255955 A1 | 11/2007 | Everett et al. |
| 2008/0005567 A1 | 1/2008 | Johnson |
| 2008/0010470 A1 | 1/2008 | McKeon et al. |
| 2008/0052515 A1 | 2/2008 | Everett et al. |
| 2008/0059812 A1 | 3/2008 | Everett et al. |
| 2008/0091956 A1 | 4/2008 | Everett et al. |
| 2008/0091957 A1 | 4/2008 | Everett et al. |
| 2008/0091958 A1 | 4/2008 | Everett et al. |
| 2008/0137842 A1 | 6/2008 | Everett et al. |

FOREIGN PATENT DOCUMENTS

| | | |
|---|---|---|
| EP | 0 157 303 B1 | 10/1985 |
| EP | 0 190 733 B1 | 8/1986 |
| EP | 0 218 176 B1 | 4/1987 |
| EP | 0 261 030 B1 | 3/1988 |
| EP | 0 275 510 B1 | 7/1988 |
| EP | 0 292 248 A2 | 11/1988 |
| EP | 0 328 289 B1 | 8/1989 |
| EP | 0 354 793 B1 | 2/1990 |
| EP | 0 451 936 B1 | 10/1991 |
| EP | 0 537 756 B1 | 4/1993 |
| EP | 0 547 741 A1 | 6/1993 |
| EP | 0 559 205 B1 | 9/1993 |
| EP | 0 588 339 B1 | 3/1994 |
| EP | 0 636 998 B1 | 2/1995 |
| EP | 0 647 902 B1 | 4/1995 |
| EP | 0 666 550 B1 | 8/1995 |
| EP | 0 751 460 A2 | 1/1997 |
| FR | 2 536 928 A1 | 6/1984 |
| GB | 2 284 689 A | 6/1995 |
| JP | 2592856 | 3/1997 |
| WO | WO 87/07062 A1 | 11/1987 |
| WO | WO 88/09019 A1 | 11/1988 |
| WO | WO 90/05960 A1 | 5/1990 |
| WO | WO 91/01538 A1 | 2/1991 |
| WO | WO 91/16691 A1 | 10/1991 |
| WO | WO 92/13322 A1 | 8/1992 |
| WO | WO 93/20538 A1 | 10/1993 |
| WO | WO 93/21612 A1 | 10/1993 |
| WO | WO 95/22810 | 8/1995 |
| WO | WO 96/19771 A1 | 6/1996 |
| WO | WO 96/28795 A1 | 9/1996 |
| WO | WO 96/38825 A1 | 12/1996 |
| WO | WO 98/43212 A1 | 10/1998 |
| WO | WO 99/10824 A1 | 3/1999 |
| WO | WO 99/16031 A1 | 4/1999 |
| WO | WO 99/16031 A3 | 4/1999 |

OTHER PUBLICATIONS

Ferreira, Ronald et al., "Key Management Protocols Using Smart Card", *Smart Card 2000: The Future of IC Cards*, Proc. Of IFIP WG 11.6 Int. Conf., Laxenburg, Austria, pp. 167-177, Oct. 19-20, 1987.

* cited by examiner

METHODS AND SYSTEMS FOR IC CARD APPLICATION LOADING

CLAIM OF PRIORITY

This application claims priority to and incorporates by reference herein U.S. Provisional Application Ser. No. 60/793,543 filed Apr. 19, 2006 entitled "Methods and Systems for IC Card Application Loading."

BACKGROUND

1. Field of the Application

Generally, this application relates to smart card technology. More specifically, it relates to a systems and methods for smart card implementation of key encryption key—key transformation unit ("K2KTU").

2. Description of the Related Art

Integrated circuit ("IC") cards are becoming increasingly used for many different purposes in the world today. Typically, an IC card (also referred to herein as a smart card) is the size of a conventional credit card or debit card and contains one or more integrated circuits, which can be in the form of one or more computer chips, including, for example, a processing element, a read-only-memory (ROM) element, an electrically erasable programmable read only-memory (EEPROM) element, an input/output (I/O) mechanism and other circuitry as may be required to support the smart card in its operations. In addition to its native operating system, an IC card may contain a single application (e.g., a debit or credit application, a purse or electronic money application, an affinity or loyalty program application, and the like) or it may contain multiple independent applications in its memory. MULTOS™ is one example of an operating system that runs on smart cards, as well as other platforms, and allows multiple independent applications to be executed on a smart card. This allows a card user to run one or more of the multiple programs stored on the card regardless of the type of terminal (e.g., an ATM, an airport kiosk, a telephone, a point of sale (POS) device, and the like) into which the card may be inserted or swiped for use.

A conventional single application IC card, such as a telephone card or an electronic cash card, is loaded with a single application at its personalization stage. Typically, that single application cannot be modified or changed after the card is issued even if the modification is desired by the card user or card issuer. Moreover, if a card user wanted a variety of application functions to be performed, such as both an electronic purse and a credit/debit function, the card user would be required to carry multiple physical single application cards on his or her person, which would be quite cumbersome and inconvenient. Further, if an application developer or card user desired two different applications to interact or exchange data with each other, such as a purse application interacting with a frequent flyer loyalty application, the card user would be forced to swap multiple single application cards in and out of the card-receiving terminal, making the transaction difficult, lengthy and inconvenient.

Therefore, it would be beneficial to have the ability store multiple applications on the same IC card. For example, a card user may have both a purse application and a credit/debit application on the same card so that the user could select which type of payment (i.e., by electronic cash or credit card) to use when making a purchase. It would be further beneficial to provide multiple applications to an IC card, where sufficient memory existed and in which an operating system capable of supporting multiple applications was present on the card. Although multiple applications could be pre-selected and placed in the memory of the card during its production stage, it would also be beneficial to have the ability to load and delete applications for the card post-production as needed.

The increased flexibility and power of storing multiple applications on a single card create new challenges to be overcome concerning the integrity and security of the information (including application code and associated data) exchanged between the individual card and the application provider, as well as within the entire system when loading and deleting applications and associated data. It would be beneficial to have the capability in the IC card system to exchange data among cards, card issuers, system operators and application providers securely and to load and delete applications securely at any time from either a terminal or remotely over a telephone line, Internet or intranet connection or other wired or wireless data conduit. Because these data transmission lines are not typically secure lines, a number of security and entity-authentication techniques must be implemented to make sure that applications being sent over the transmission lines are only loaded on the intended cards.

However, typical processes used in the art today for securely transmitting data and/or applications to an IC card do not handle batch loading of the data and/or applications well because the information is targeted to an individual IC card using that IC card's public card. If a transmitting entity were desirous of populating multiple IC cards with the same data and/or application, an encrypted set of data would have to be created for each IC card separately. One example of this typical process is illustrated in commonly-owned U.S. Pat. No. 6,230,267, which is also fully incorporated herein for all purposes. Another example is illustrated in commonly-owned U.S. Pat. No. 6,632,888, which is also fully incorporated herein for all purposes.

FIG. 1 illustrates an example of a typical, secure application load process used in conjunction with the MULTOS™ IC card system. As shown in FIG. 1, an application load unit prime 10 is created to include an encrypted application load unit 100 using the application provider secret key ("AP_SK") 11 in combination with a key transformation unit ("KTU") prime 102. Typically the KTU prime 102 is created by performing a triple DES operation (i.e., key-encryption-key, key encryption key ("KEK"), operation) on the standard KTU using a transport key. The application load unit prime is then transmitted via typical methods to be loaded onto an IC card 18. However, prior to loading, the KTU prime 102 must be translated (i.e., decrypted) at 152 back to the regular KTU 154. This operation requires that a hardware security module ("HSM") 15 be located locally at the personalization bureau. The HSM 15 communicates securely with the application provider to perform a secure key ceremony 14 whereby the KEK 12, 12' transport key is exchanged. Once the HSM 15 has the transport key 12, it can translate the KTU prime 102 back to the regular KTU 154. Then, the regular application load unit can be used load the application to the target card.

However, typical processes used in the art today for securely transmitting data and/or applications to an IC card do not handle batch loading of the data and/or applications well because the information is targeted to an individual IC card using that IC card's public card. If a transmitting entity were desirous of populating multiple IC cards with the same data and/or application, an encrypted set of data would have to be created for each IC card separately. One example of this typical process is illustrated in commonly-owned U.S. Pat. No. 6,230,267, which is also fully incorporated herein for all purposes. Another example is illustrated in commonly-owned U.S. patent application Ser. No. 09/932,013, issued as U.S. Pat. No. 7,469,339, which is also fully incorporated herein for all purposes.

BRIEF DESCRIPTION OF THE DRAWINGS

Aspects and features of this application will become apparent to those ordinarily skilled in the art from the following detailed description of certain embodiments in conjunction with the accompanying drawings, wherein.

DETAILED DESCRIPTION

Figure 1:
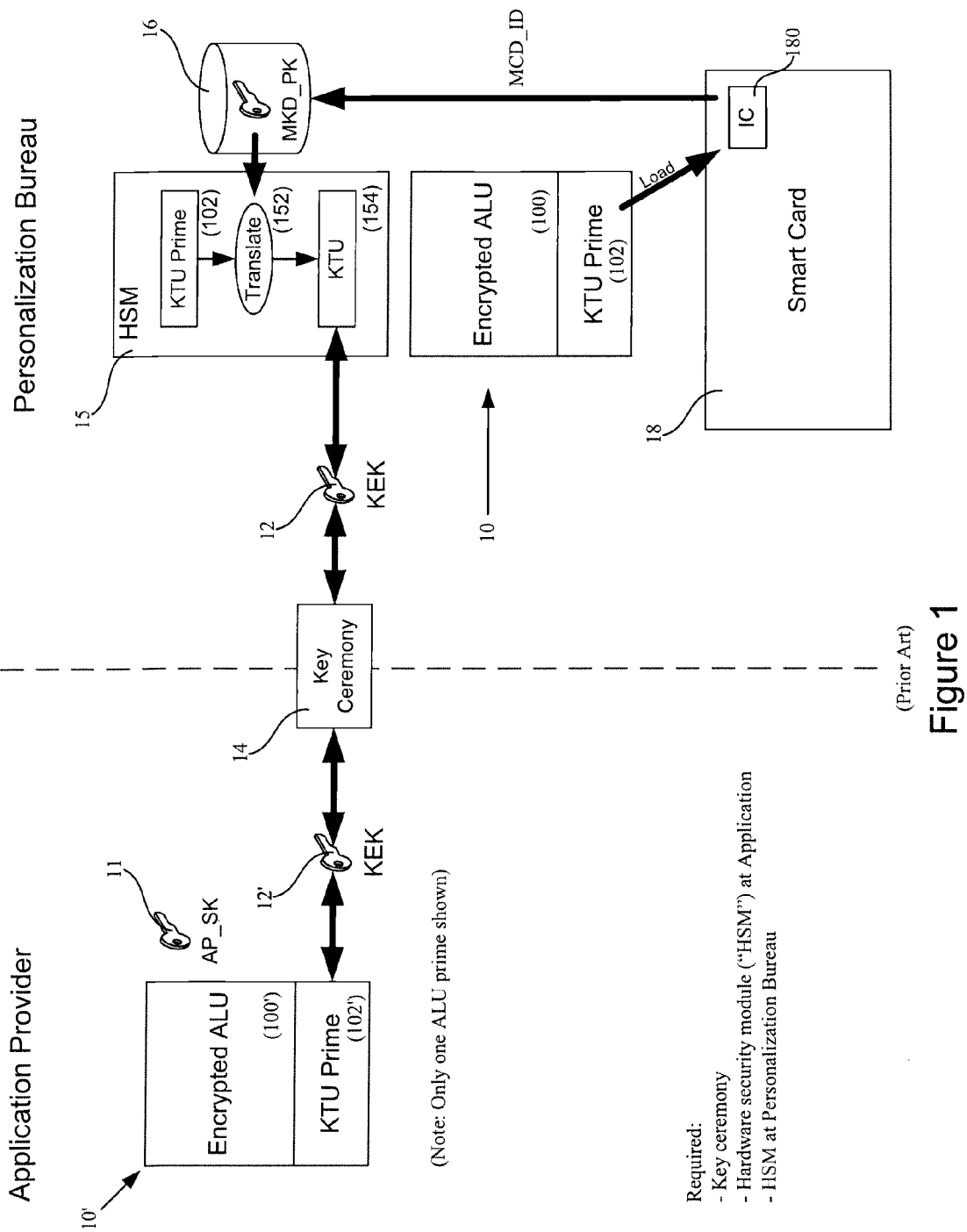
FIG. 1 illustrates an example of a typical, secure application load process used in conjunction with the MULTOS™ IC card system.

Embodiments will now be described in detail with reference to the drawings, which are provided as illustrative examples of certain embodiments so as to enable those skilled in the art to practice the embodiments and are not meant to limit the scope of the application. Where aspects of certain embodiments can be partially or fully implemented using known components or steps, only those portions of such known components or steps that are necessary for an understanding of the embodiments will be described, and detailed description of other portions of such known components or steps will be omitted so as not to obscure the embodiments. Further, certain embodiments are intended to encompass presently known and future equivalents to the components referred to herein by way of illustration.

As used herein, the terms application provider and personalization bureau are used as a matter of convenience, for consistency and clarity. However, as will become evident to those skilled in the art, the functions of both can be performed at either one of the facilities or even at a completely different facility including, for example, at the card issuer. Such variations are accommodated in many embodiments and fall within the scope of the invention.

Certain embodiments propose a new type of application load unit ("ALU") for use in the secure loading of applications and/or data onto IC cards (or smart cards). This new type of ALU, as discussed herein, will be referred to as a confidential ALU prime. In certain embodiments, the ALU prime can be created using combinations of conventional techniques augmented according to certain aspects of the invention. For example, the encrypted ALU can be combined with the KTU prime, which is an encrypted KTU using a KEK. In addition, a new component can also be created and combined in the ALU prime. This new component, as discussed herein, will be referred to as a card-specific KEK KTU (K2KTU). This new type of KTU is also a type of card-targeted KTU, but instead of the KTU containing the keys that were used to encrypt the ALU (as the regular KTU and KTU prime contain), the K2KTU contains the KEK used to create the KTU prime. In this way, no HSM will be necessary at the personalization facility.

In certain embodiments, one K2KTU can be created for each smart card to be loaded with a particular application; that is, the KEK may be individually encrypted under each Public Key of each target smart card. In certain embodiments, a KEK can be provided that is common to all KTU primes and an application provider may create a K2KTU for a plurality smart cards independent of related ALU primes. However, it will be appreciated that in certain embodiments, the KEK used should match and will typically remain constant over time although, in certain embodiments the KEK may be permitted to change on occasion.

In certain embodiments, to ensure the integrity of the K2KTU, the application provider can digitally sign each K2KTU using the same application provider secret key (AP_SK) that was used to create the application signature. This will ensure that only genuine K2KTUs are ultimately processed. This signature feature provides advantages including, for example, the ability to overcome one of the existing security weaknesses of the MULTOS™ application loading system whereby, in the current system, the regular KTUs (and thus the KTU primes) are not digitally signed by the application provider.

Figure 2:
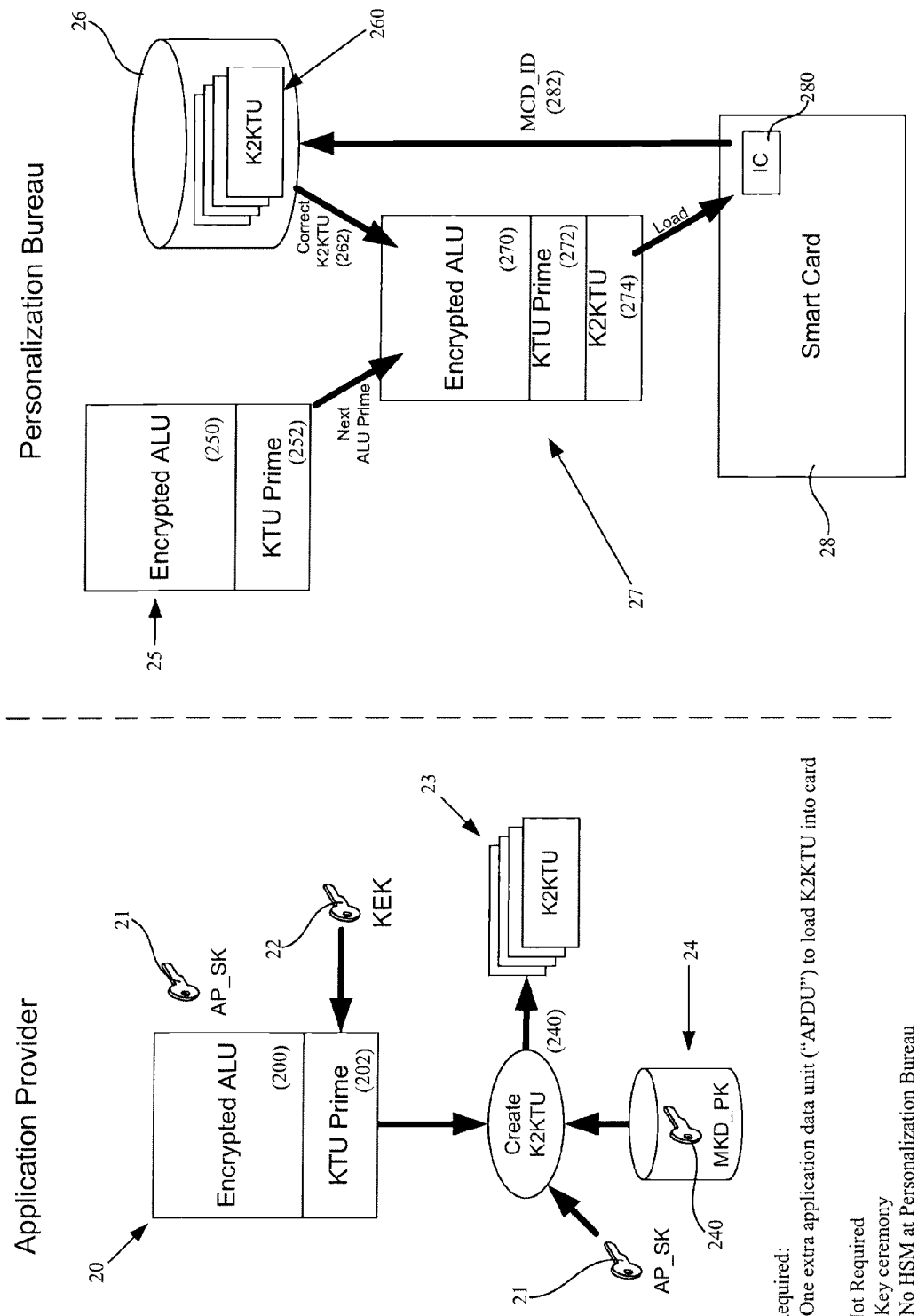
FIG. 2 illustrates an example of a novel secure application load process used in conjunction with an IC card system according to certain embodiments.

FIG. 2 illustrates an example of a novel secure application load process used in conjunction with an IC card system according to certain aspects of the invention. As shown in FIG. 2, an application provider can create one or more ALU primes 20 using the AP_SK 21 and KEK 22 as described above and as is currently performed. However, the application provider can then additionally create one or more K2KTUs 23, one for each target IC card 28 using the public key (MKD_PK) 240 of the target card 28, which can be obtained from storage 24 such as a database of card public keys that can be provided, for example, by a key management authority. The application provider can further digitally sign each K2KTU 23 using its AP_SK 21. Having secured the set of K2KTUs 23 for an application, the application provider can transmit the ALU primes 20 and the K2KTUs 23 to the personalization bureau via any secure or non-secure transmission means.

As shown in FIG. 2, at the personalization bureau, an ALU prime 25 can be selected for loading on a desired smart card 28. Based on the card ID (MCD_ID) 282, and, as applicable, an application ID, a correct K2KTU 262 can be selected from the one or more K2KTUs 260 created for that application. After loading the KTU prime 252 from the ALU prime 25 into the target IC card 28, the K2KTU 262 can be loaded. However, the order of these loads can be altered within the scope of certain embodiments. After load initiation (e.g., using a "CREATE MEL" command), the certificate can be checked and the AP_PK extracted. The application signature may then be checked. Following application signature check, the K2KTU signature can be verified using AP_PK. The K2KTU 262 can be decrypted using the smart card's secret key (MKD_SK). Then the K2KTU 262 can be checked to ensure that this particular ALU is intended for the desired IC card 28. Finally, the regular KTU can be decrypted using the KEK 22 contained within K2KTU 262. Once the regular KTU is translated from the KTU prime 25 using the KEK 22, application load proceeds as normal.

In certain embodiments, no HSM need be present at the location of the card application terminal (i.e., no key ceremony is required) when the K2KTU component is used. Further, the application provider can create multiple K2KTUs 23 for an application or create multiple sets of K2KTUs 23 for an associated set of multiple applications and distribute the one or more confidential ALU primes 20 to a personalization bureau for more efficient batch processing of multiple IC cards. For a particular application (e.g., based on an applications ID) and a particular card (i.e., based on the card's ID), the proper K2KTU can be selected from the proper set of K2KTUs (i.e., where each set of K2KTUs can be representative of a particular application, and each member K2KTU within a set is associated with a particular card to receive that application).

Additional Descriptions of Certain Aspects of the Invention

Certain embodiments of the invention provide methods for securely loading an application, comprising the steps of maintaining a plurality of cryptographic keys in an electronically addressable device, communicating one or more applications to the device, the one or more applications encrypted using cryptographic keys provided in a first plaintext key transformation unit, the first plaintext key transformation unit being encrypted using a common key, wherein the common key and the one or more applications are furnished by a provider and the common key is common to a plurality of devices, and communicating the common key to the device in a second plaintext key transformation unit, the second plaintext key transformation unit being encrypted using one or more device-specific transport keys. In some of these embodiments, each of the communicating the one or more applications and the communicating the common key is secured using selected ones of the plurality of cryptographic keys including a provider-specific key. In some of these embodiments, the plurality of cryptographic keys includes a device-specific public transport key. In some of these embodiments, the common key is communicated to the device upon verification of the device-specific public transport key by a key management authority.

In some of these embodiments, the plurality of cryptographic keys includes a device-specific secret transport key operative to extract the common key from the second plaintext key transformation unit. In some of these embodiments, the plurality of cryptographic keys includes the common key and wherein the second plaintext key transformation unit is digitally signed using a secret key of the provider. In some of these embodiments, the communicating includes communicating one or more of the plurality of cryptographic keys to the provider, the one or more cryptographic keys including a device-specific public transport key, and identifying the device to the provider. In some of these embodiments, the device is one of a plurality of devices and further comprising the steps of encrypting each of the one or more applications using keys associated with the each application, encrypting the first plaintext key transformation unit using the common key, the plaintext key transformation unit including the associated keys and corresponding application-specific information, and for each of the plurality of devices, encrypting second plaintext key transformation units using public transport keys associated with each of the plurality of devices, the second plaintext key transformation units including the common key, information specific to the each application and device-specific information, and digitally signing each second key transformation unit using a private key of the provider.

In some of these embodiments, the second plaintext key transformation units are encrypted using symmetric encryption. In some of these embodiments, the symmetric encryption is Triple DES. In some of these embodiments, the symmetric encryption is AES. In some of these embodiments, the plurality of cryptographic keys includes keys associated with the plurality of devices. In some of these embodiments, the device-specific secret key and the device-specific public key are provided using an asymmetric technique. In some of these embodiments, the asymmetric technique is RSA. In some of these embodiments, the plurality of cryptographic keys includes certified public and secret keys furnished by a certification authority, and further comprising the steps of encrypting a provider-specific public key using a certified secret key to obtain a provider-specific public key certificate, signing the encrypted application using a provider-specific secret key to obtain a digital signature, and signing the second key transformation unit using the provider-specific secret key to obtain a digital signature. In some of these embodiments, the step of verifying the provider-specific public key certificate with the certified public key.

In some of these embodiments, the method also comprises deriving the provider-specific public key from a decrypted public key certificate associated with the provider, and verifying the digital signatures of the application and second key transformation unit based on the derived provider-specific public key. In some of these embodiments, the decrypted public key certificate contains application-specific information. In some of these embodiments, the method also comprises decrypting the verified second plaintext key transformation unit using a verified device-specific private transport key, and verifying the resultant first plaintext key transformation unit is intended for the device, the verifying including comparing the identity of the device with a device identification in the first plaintext key transformation unit, confirming that the plurality of cryptographic keys includes the common key, decrypting the first plaintext key transformation unit associated with the application using the first key, associating the first plaintext key transformation unit with the decrypted second plaintext key transformation unit, and decrypting the application using the plurality of keys contained within the first plaintext key transformation unit.

In some of these embodiments, a device is employed that comprises a computing device and storage, the device configured to receive an encrypted application, wherein the storage maintains a plurality of cryptographic keys including a device-specific private transport key and a common key and the computing device is configured to decrypt the encrypted application using the device-specific private transport key and the common key. In some of these embodiments, the encrypted application is encrypted using cryptographic keys provided in a first plaintext key transformation unit, the first plaintext key transformation unit being encrypted using the common key, wherein the common key and the one or more applications are furnished by a provider. In some of these embodiments, the common key is provided to the device in a second plaintext key transformation unit, the second plaintext key transformation unit being encrypted using one or more device-specific transport keys. In some of these embodiments, the encrypted application and the common key are provided to the device using selected ones of the plurality of cryptographic keys including a provider-specific key to secure communication of the encrypted application and the common key.

In some of these embodiments, a method for secure application loading of an application to electronically addressable devices is provided. The method may comprise the steps of maintaining a plurality of cryptographic keys within the device, providing the device with one or more applications, encrypted using a plurality of cryptographic keys within a plaintext key transformation unit and said plaintext key transformation unit being encrypted using a non-device-specific key, each application and non-device-specific key being furnished by a provider, providing the device with the non-device-specific key within a plaintext key transformation unit, encrypted using a device-specific transport key resulting in the key-encryption-key key transformation unit. In some of these embodiments, the communication of the application and non-device-specific key are secured using selected ones of the plurality of cryptographic keys, including a provider-specific key associated with a provider.

In some of these embodiments, the method may further comprise encrypting a plurality of applications intended for different devices using a plurality of keys, formatting the plurality of keys and application-specific information into a plaintext key transformation unit and encrypting said key transformation unit using a single non-device-specific key, formatting the non-device-specific key, application-specific information and device-specific information into a plaintext key transformation unit and encrypting said key transformation unit using each of the device-specific public transport keys of the plurality of devices resulting in the key-encryption-key key transformation units, digitally signing each key-encryption-key key transformation unit using a provider private key.

Although the application has been particularly described with reference to embodiments thereof, it should be readily apparent to those of ordinary skill in the art that various changes, modifications, substitutes and deletions are intended within the form and details thereof, without departing from the spirit and scope of the application. Accordingly, it will be appreciated that in numerous instances some features of certain embodiments will be employed without a corresponding use of other features. Further, those skilled in the art will understand that variations can be made in the number and arrangement of inventive elements illustrated and described in the above figures. It is intended that the scope of the appended claims include such changes and modifications.

What is claimed is:

1. A method for securely loading an application, comprising the steps of:
   communicating at least one application load unit, said application load unit comprising the application and security data for authentication and protection of code and data associated with the application, to a selected one of a plurality of devices, the at least one application load unit being encrypted using cryptographic keys provided in a first plaintext key transformation unit, the first plaintext key transformation unit being encrypted using a common key, wherein the common key and at least one application load unit are furnished by an application provider and the common key is common to the plurality of devices; and
   communicating the common key to the selected device in a second plaintext key transformation unit, the second plaintext key transformation unit being encrypted using a public key of said selected device, wherein
      each of the step of communicating at least one application load unit and the step of communicating the common key is secured using a secret key of the application provider.

2. A method according to claim 1, wherein the step of communicating the common key to the selected device is preceded by a step of verifying the public key of said selected device by a key management authority.

3. A method according to claim 1, wherein the second plaintext key transformation units are encrypted using symmetric encryption.

4. A method according to claim 3, wherein the symmetric encryption is Triple DES.

5. A method according to claim 3, wherein the symmetric encryption is AES.

6. A method according to claim 1, wherein the device-specific secret key and the device-specific public key are provided using an asymmetric technique.

7. A method according to claim 6, wherein the asymmetric technique is RSA.

8. A method according to claim 1, wherein the cryptographic keys comprise certified public and secret keys furnished by a certification authority, and further comprising the steps of:
   encrypting a public key of the application provider using a certified secret key to obtain a provider-specific public key certificate; signing the encrypted application load unit using the secret key of the application provider to obtain a digital signature; and
   signing the second key transformation unit using the secret key of the application provider to obtain a digital signature.

9. A method according to claim 8, and further comprising the step of verifying the provider-specific public key certificate with a certified public key.

10. A method according to claim 9, and further comprising the steps of:
    deriving the public key of the application provider from a decrypted public key certificate associated with the application provider; and
    verifying the digital signatures of the application and second plaintext key transformation unit based on the derived public key.

11. A method according to claim 10, wherein the decrypted public key certificate contains application-specific information.

12. A method according to claim 10, and further comprising the steps of:
    decrypting the verified second plaintext key transformation unit using a verified secret key of said selected device; and
    verifying the first plaintext key transformation unit is intended for the selected device, the verifying comprising
       comparing the identity of the selected device with a device identification in the first plaintext key transformation unit,
       confirming that a plurality of cryptographic keys stored on the selected device includes the common key,
       decrypting the first plaintext key transformation unit associated with the application using the common key,
       associating the first plaintext key transformation unit with the decrypted second plaintext key transformation unit, and
       decrypting the application using the cryptographic keys provided in the first plaintext key transformation unit.

13. A device comprising a computing device and storage, the device configured to receive an encrypted application load unit, said application load unit comprising an application and security data for authentication and protection of code and data associated with the application, wherein:
    the storage maintains a plurality of cryptographic keys including a secret key of said device and a common key; and the computing device is configured to decrypt the encrypted application load unit using the secret key and the common key, wherein:
    the encrypted application load unit is encrypted using cryptographic keys provided in a first plaintext key transformation unit, the first plaintext key transformation unit being encrypted using the common key, wherein the common key and the one or more applications are furnished by an application provider; the common key is provided to the device in a second plaintext key transformation unit, the second plaintext key transformation unit being encrypted using a public key of the device; and the encrypted application and the common key are provided to the device using a secret key of the application provider.

* * * * *